April 23, 1929.  R. S. PEARSON  1,710,002
MECHANICAL MOVEMENT
Filed Aug. 12, 1926   2 Sheets-Sheet 1

Inventor
Roy S. Pearson
By Daniel Brennan
Attorney

April 23, 1929.  R. S. PEARSON  1,710,002
MECHANICAL MOVEMENT
Filed Aug. 12, 1926  2 Sheets-Sheet 2
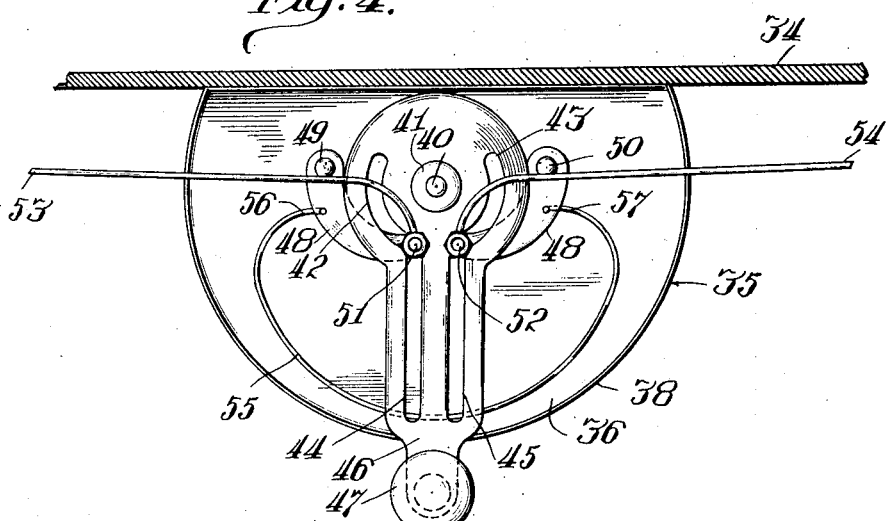
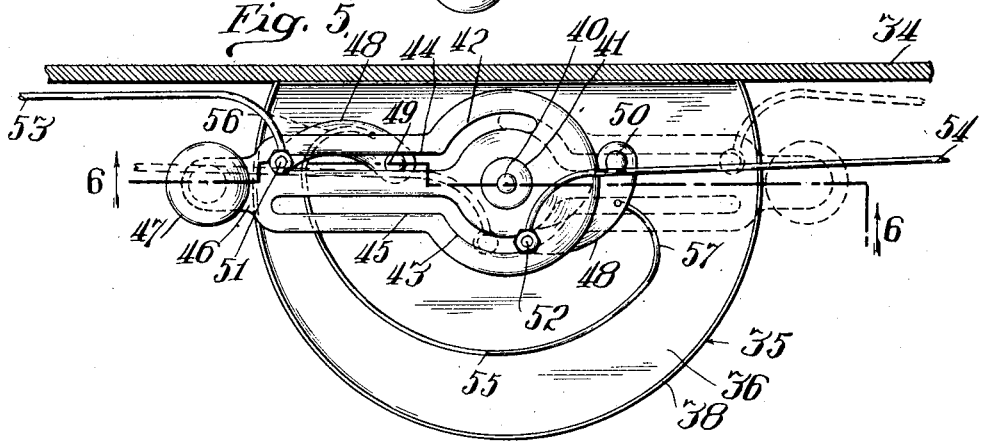
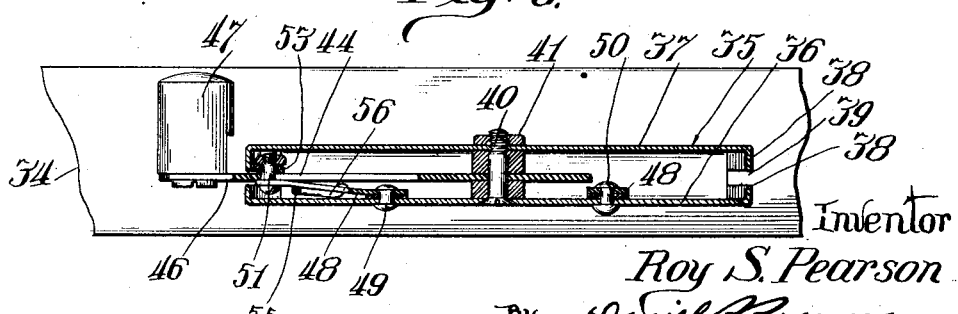
Inventor
Roy S. Pearson
By Daniel P Brennen
Attorney Patented Apr. 23, 1929.

1,710,002

UNITED STATES PATENT OFFICE.

ROY S. PEARSON, OF CHICAGO, ILLINOIS.

MECHANICAL MOVEMENT.

Application filed August 12, 1926. Serial No. 128,827.

This invention relates broadly to mechanical movements and more particularly to such devices wherein a plurality of reciprocating movements in various angularly related directions may be produced by a single rotary movement and whereby the elements moved are substantially automatically locked in their respective positions by the moving element.

The device of this invention is susceptible of a general use and, therefore, has been disclosed without actual connection to a mechanism affected, it being understood that the invention finds a wide field of utility.

The principal objects and advantages reside in the provision of an improved mechanical movement including reciprocating elements operated by a rotary member; the provision of an improved mechanical movement including one or more angularly displaceable members and rotary means for displacing said members progressively; and the provision of an improved mechanical movement wherein means is provided for holding the elements thereof in predetermined positions.

The foregoing and such other objects and advantages as may appear or be pointed out as this description proceeds are attained in the structural embodiment illustrated in the accompanying drawings, in which:

Figures 4 and 5 are plan views of an alternative form of the invention, illustrating different positions of the device; and Figure 6 is a sectional view taken on line 6—6 of Figure 5 looking in the direction indicated by the arrows.

Figure 1:
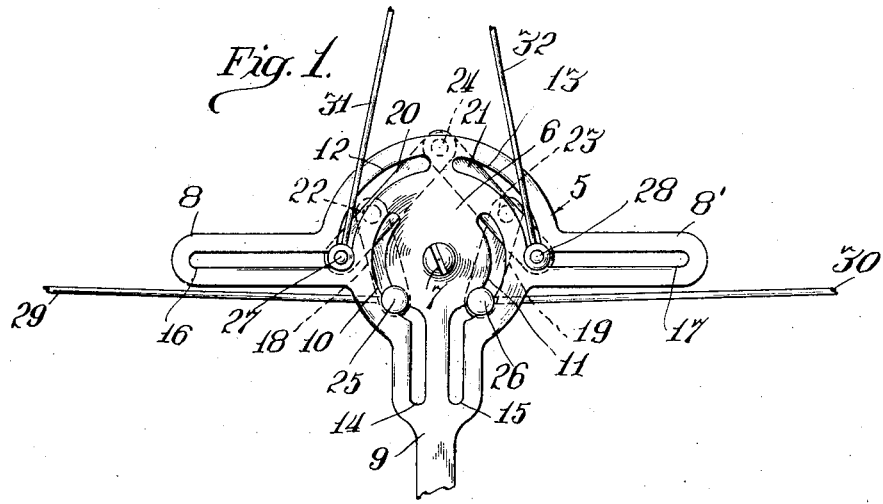
Figure 1 is a plan elevational view of the device in one of its positions.
Figure 2:
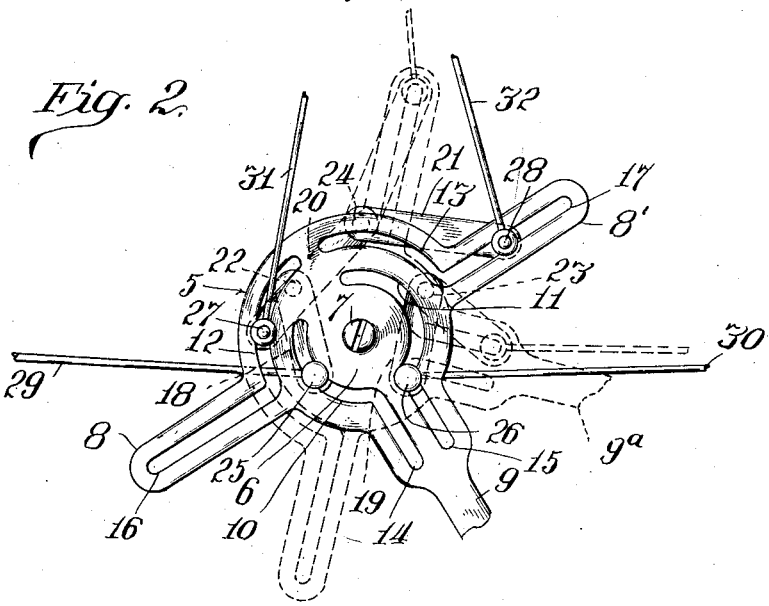
Figure 2 is a similar view of the device in another of its positions.
Figure 3:
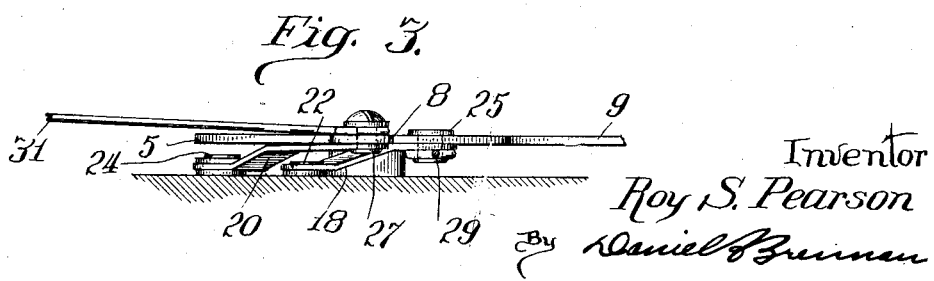
Figure 3 is a side elevational view of the device.

Referring more particularly to the drawings and first to the form of the invention shown in Figures 1 to 3, both inclusive, I provide a motion transmitting element generally designated 5 and including a disk-like portion 6 mounted for rotation about an axis 7 which may be suitably relatively fixedly mounted as desired.

The disk 6 is provided with radially extending arms 8', 8 and 9, the latter arm being employed as a manual or other means for rotating the disk by oscillation of said arm. The disk is provided with a plurality of arcuate slots 10, 11, 12 and 13, which slots, respectively, have extensions or continuations thereof, 14, 15, 16 and 17, which are substantially straight and located in the respective arms 9, 8' and 8. It will be observed that the arcuate slots 10, 11, 12 and 13 are described about the axis of rotation 7, the slots 10 and 11 overlapping in length the adjoining slots 12 and 13. The slots 12 and 13 terminate with their ends adjacent to form stops, and the closed ends of the slots 10 and 11 also form stops.

A plurality of angularly displaceable elements are provided designated 18, 19, 20 and 21, the elements 18 and 19 being mounted for angular displacement about relatively fixed pivots 22 and 23, respectively, and the angularly displaceable elements 20 and 21 being mounted for angular displacement about a common pivot 24.

The angularly displaceable elements are provided at their freely movable ends with laterally projecting portions 25, 26, 27 and 28, respectively, and a plurality of elements to be reciprocated, designated 29, 30, 31 and 32, are pivotally connected to said lateral projections respectively.

For convenience in assembly and operation of the structure shown, the members 29 and 30 are connected below the disk, that is, adjacent to the base upon which the same is mounted, but which has not been shown in the drawing, and the members 31 and 32 are connected to the outer or upper ends of the projections 27 and 28. In order that the angularly displaceable elements 18 and 19 will not interfere with the angularly displaceable elements 20 and 21, these elements are, as shown in Figure 3, offset so that when the elements are crossed in assembly, as shown in Figures 1 and 2, they will be overlapped and pass without striking In a position which may, for the sake of convenience, be called a normal position, the device is as shown in Figure 1. It will be obvious that oscillation of the lever 9 will produce a displacement of at least one of the angularly displaceable elements, while the others remain at rest. For instance, upon reference to Figure 2, displacement of the lever 9 to the right in the degree there shown will cause a reciprocation and a partial angular displacement of the element 32 by virtue of its connection to one end of the angularly displaceable element 21, said element having the extension 28 thereof caused to slide outwardly in the straight slot 17. This displacement will continue throughout approximately 90 degrees displacement of the lever 9 to the point shown at 9ª in dotted lines in Figure 2. However, when the lever 9ª is moved beyond the position shown in Figure 2 to the right, then the disk portion has been so displaced as to cause the extension 26 to enter slot 15 and thereby produce an angular displacement of the member 19 and the resultant reciprocation and partial angular displacement of the element 30 to the right. During the movement of the elements 32 and 30 consecutively, no movement of the elements 29 and 31 takes place because the curvature of the slots 10 and 12 is concentric with the axis of rotation. It will be obvious that upon displacement of the lever 9 to the left in a corresponding degree to that shown in Figure 2, both in the full line and dotted line position, the elements 29 and 31 will be displaced without displacing the elements 30 and 32.

The invention shown in Figures 1 to 3 is capable of employment in various mechanisms and finds utility when employed in operating railway signals in an interlocking plant wherein it is necessary to maintain locked against movement certain elements of the switches or signals while other elements of the switches or signals are moved. It will be observed in the position of Figure 1, assuming that the lever 9 is manually or otherwise locked, no reverse movement of the elements 29, 30, 31 and 32 can take place. I do not intend to confine my invention to railway track installations or interlocking plants or the like, as it finds a wide field of utility for other purposes, the reference being made to such installations merely for purpose of convenience in describing.

Referring now more particularly to Figures 4 to 6, an alternative form of the invention is there shown, wherein the structure has particularly been found to be useful in connection with operating automobile direction signals or other signalling means, in fact, any elements which require alternative operation.

In this form of the invention a base member 34 is provided on which a substantially circular casing 35 is mounted. The casing 35 preferably includes a fixedly mounted portion 36 and a removably mounted portion 37, said portions 36 and 37 having annular flanges 38 spaced to afford a circular slot 39 for accommodation of the operating lever.

A bolt 40 extends through the portions 36 and 37 of the casing 35 and receives a retaining nut 41 for holding the assembly portion 37 in position.

The operating mechanism here includes a disk portion rotatably mounted on the bolt 40 as an axis and provided with arcuate slots 42 and 43 complemental to and connected with parallel straight slots 44 and 45, respectively, formed in the operating arm 46. Said arm 46 extends radially from the disk through the slot 39 and is provided with an operating handle 47.

Motion is imparted from the disk 41 to a pair of curved angularly displaceable links 48, which latter are pivoted on the portion 36 of the casing at the points 49 and 50 and are connected with the slots 42 and 43 by the provision of suitable bolts 51 and 52 entering said slots. The bolts 51 and 52 serve as connecting means to rods 53 and 54, respectively, which may extend to any auxiliary mechanism which it is desired to operate. It will be observed that by shifting lever 46 to the right or left, as shown in Figure 5, one or other of the rods 53 or 54 will be caused to reciprocate by a displacement of the bolts 51 and 52 in the curved and straight parts of the slots 42 and 44 and 43 and 45. Assuming that a neutral position is desired, in order that this position may be substantially accurately obtained by the operator, I provide a yieldingly resistant member 55 in the nature of a contractile spring having curved ends 56 and 57 pivotally connected to the links 48 between the pivots 49 and 50 and bolts 51 and 52, respectively. The tendency of the spring is to move the levers toward the axis of rotation of the disk and hence to cause the lever 46 to seek a neutral or central position, as shown in Figure 4. For convenience, spacing blocks are interposed between the disk 41 and the walls or sections 36 and 37 of the casing 35 and, as will be observed from an inspection of Figure 6, the links 48 are offset so as to bring their outer ends into position immediately below the arm 46 for facilitating connection to the slots formed therein.

I find the form of the invention shown in Figures 4 to 6 convenient for operation of direction signals employed in automobiles, the movement of the lever 46 alternately operating the rods 53 and 54 which may, of course, be connected to some sort of a semaphore or other swinging member (not shown) for giving the alternate indications as to direction. It is obvious that the movement of the arm 46 through 90° to the left, as shown in Figure 5, will serve only to operate the rod 53, the rod 54 remaining stationary owing to the fact that the slot 43 in which the bolt 52 lies is described about the axis of rotation and no displacement of said bolt can take place. It will, furthermore, be observed that at no time in the positioning of the lever 46 can a reverse action of the rods affect or change the position of said lever except where the lever is between neutral position and 90°. In this event, referring to Figure 5, if the lever were in 45° position to the left, it would be possible for the rod 53 to return it to neutral position but no movement of the rod 54 could change the relation of the parts at that point.

Having thus described my invention and illustrated its use, what I claim as new and desire to secure by Letters Patent is:

1. A mechanical movement comprising a rotatable member provided with radially projecting extensions, there being a plurality of slots in said member, said slots being provided with concentric portions and eccentric portions projecting into said extensions, a plurality of angularly displaceable elements having lateral projections projecting through and operating in said slots, elements connected to and displaced by the projecting ends of said lateral projections, and yielding means holding said projections in the concentric portions of said slots.

2. A mechanical movement comprising a rotatable member having a pair of co-operating slots therein, said slots having each a concentric and an eccentric portion, two angularly displaceable elements each having a lateral projection operating in one of said slots, an element operatively connected with each of said lateral displaceable elements, and yieldable means for holding said projections in the concentric portions of said slots.

3. A mechanical movement comprising a rotatable member having a pair of co-operating slots therein, said slots having each a concentric and an eccentric portion, two angularly displaceable elements each having a lateral projection operating in one of said slots, an element operatively connected with each of said laterally displaceable elements, and a contractile spring having its ends connected with said angularly displaceable elements and operating to simultaneously press said projections toward the concentric portions of said slots.

4. A mechanical movement comprising a rotatable plate provided with a slot, an angularly displaceable element pivotally mounted at one side of said plate and having a lateral projection operating in and projecting through said slot, and a displaceable element connected to said lateral projection on the opposite side of said plate.

5. A mechanical movement comprising a rotatable plate provided with radially projecting extensions, there being a plurality of slots in said plate, said slots being provided with concentric portions and with eccentric portions projecting into said extensions, a plurality of angularly displaceable elements pivotally mounted at one side of said plate and having lateral projections projecting through and operating in said slots, and displaceable elements connected to said projections on the opposite side of said plate.

In testimony whereof I affix my signature at 10 South La Salle Street, Chicago, Ill.

ROY S. PEARSON.